ANTENNA OPERABLE WITHIN TWO FREQUENCY RANGES, PARTICULARLY VHF AND UHF RANGES

Filed Feb. 15, 1965

INVENTOR.
STANLEY LEJKOWSKI SR.
BY
ATTORNEY 3,389,395
Patented June 18, 1968

3,389,395

ANTENNA OPERABLE WITHIN TWO FREQUENCY RANGES, PARTICULARLY VHF AND UHF RANGES

Stanley Lejkowski, Sr., 154 Hillhurst Ave., New Britain, Conn. 06053

Filed Feb. 15, 1965, Ser. No. 432,493
15 Claims. (Cl. 343—743)

ABSTRACT OF THE DISCLOSURE

There is disclosed an antenna operable within two ranges of frequency which are spaced from one another in the frequency spectrum. The antenna comprises a conductive frame disposed along a planar axis having a pair of adjacent ends supported in spaced insulated disposition, a plurality of spaced dipole elements supported on the frame, and connection means disposed near the insulated ends. The frame has an electrical length substantially equal to an integral multiple of the wave length of the highest of the frequencies and not less than one-sixteenth of the wave length of the lowest frequency, and the dipoles are graduated in size from an electrical length of substantially one-quarter wave length of the highest frequency to one-sixteenth of the lowest.

Figure 2:
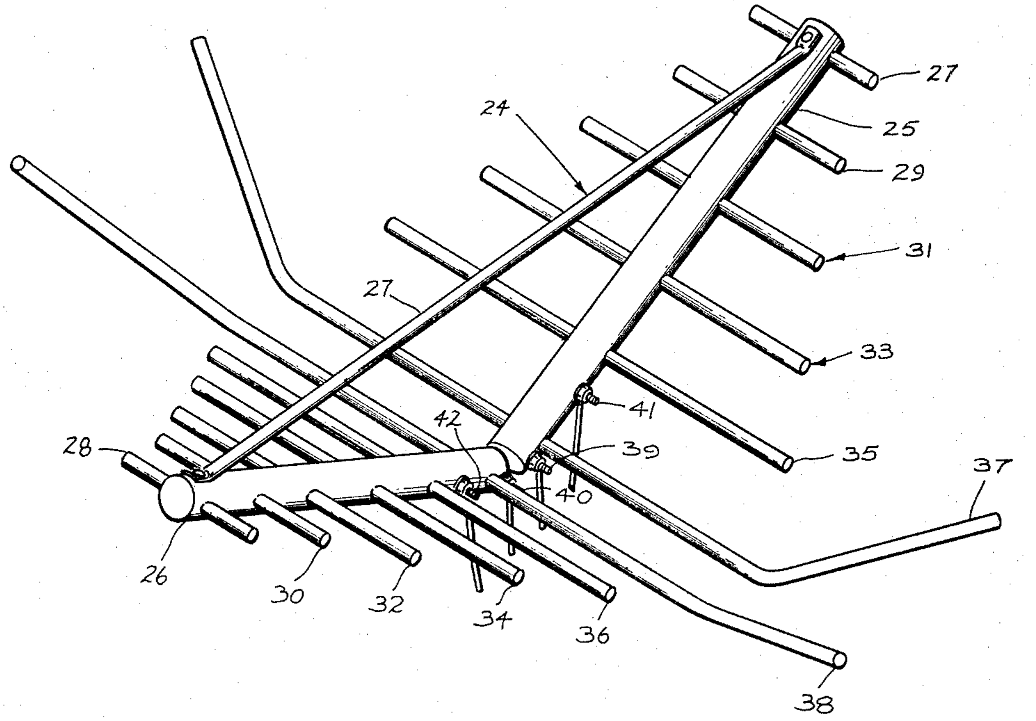

This invention is concerned with an antenna of the broad band type and more particularly an antenna which is especially adaptable to receiving radiated signals within two relatively widely spaced frequency ranges within the frequency spectrum, one of such frequencies lying in the VHF range and the other lying within the UHF frequency range.

In assigning and designating frequency ranges for television and radio broadcast, the Federal Communications Commission has assigned the frequency range of 54 megacycles to 88 megacycles to channels 2 through 6 for television broadcast purposes and the range of 174 megacycles to 216 megacycles for television broadcast purposes including channels 7 through 13. Within the range of 88 megacycles to 174 megacycles, frequency modulation radio broadcast stations have been assigned frequencies. All the above mentioned frequency ranges comprising two separated frequency ranges for television broadcast and a range of frequency lying therebetween for frequency modulation radio broadcast lie within the VHF frequency range of the frequency spectrum.

More recently, the Federal Communications Commission has assigned a range of frequencies from 470 megacycles to 890 megacycles to channels 14 through 82 for television broadcast. These latter assigned frequencies lie within the UHF frequency range of the frequency spectrum. Additionally, the Federal Communications Commission has required that manufacturers of television receiving equipment provide that such equipment is adapted to receive the UHF channels of television broadcast, namely 14 through 82, as well as the older television channels lying within the VHF frequency range, namely channels 2 through 13. Accordingly, it is highly desirable that the owner of a present-day television receiver equip his receiver with an antenna which is capable of receiving signals over an extermely broad band, and more particularly the older VHF band which includes channels 2 through 13 and the more recently established UHF channels which include channels 14 through 82. In many instances, owners of television receiver sets have adapted their sets to receive signals from two television antennas, one of which is designed specifically to receive VHF signals within the assigned older frequency ranges including channels 2 through 13 and a second antenna which is particularly designad to receive signals of the more recently established UHF channels 14 through 82. Many television set owners have experienced difficulty, particularly in developing adequate reception of UHF signals in fringe areas. Part of this difficulty has been due to the fact that the higher frequencies are inherently subject to more severe attenuation problems under certain conditions.

Accordingly, it is an object of the present invention to provide a broad band antenna especially suited to receive television broadcast signals within both the earlier VHF frequency range and the more recently established UHF frequency range.

Another object of the present invention is to provide such an antenna which is small in size, relatively simple and inexpensive to fabricate, and highly efficient in fringe areas.

Another object of the present invention is to provide an antenna for television broadcast reception which has well-balanced performance characteristics, as between the split assigned television broadcast frequencies within the VHF range and the UHF range as well.

Another object of the present invention is to provide a single antenna for the reception of television broadcast signals within both VHF and UHF frequency ranges which can be conveniently and readily switched from VHF to UHF reception as desired without special impedance matching equipment or circuitry.

The invention in one form comprises a conductive frame disposed along a planar axis and having a pair of adjacent ends supported in spaced insulated disposition, the frame having an effective electrical length which is substantially equal to an integral multiple of the wave length of the highest frequency of the frequency ranges to be received and not less than one-sixteenth wave length of the lowest frequency of the frequency ranges to be received. A plurality of spaced dipole elements are supported in conductive relationship on the frame in a direction generally normal to the planar axis of the frame, the dipole elements being graduated in size from an effective electrical length of substantially one-quarter wave length of the highest frequency of the ranges of frequency to be received to one-sixteenth wave length of the lowest frequency of those ranges. One set of connection means is provided at the insulated end of the conductive frame which is connectable to a television receiver, for example, for reception of the higher of the two frequency ranges which in most instances will be the UHF frequency range. A second connection means is provided at a point spaced from the insulated ends of the frame which connection means is adapted for connecting a television receiver to receive the lower of the two frequency ranges to be received, i.e., the VHF frequency range.

The conductive frame of the present invention may take several forms and in one form, which is particularly adaptable to indoor use, the frame is shaped as a relatively small circle having a diameter of the order of five inches with the dipole elements spaced thereabout in the general manner described above. In a larger version, the antenna and more particularly the conductive frame may take the form of a isosceles triangles with the base of the triangle at the upper portion connecting to substantially equal legs which terminate at spaced insulated ends. The latter version may have an overall maximum dimension of approximately twenty-four inches and, it is readily apparent that even in its larger version, the antenna of the present invention is smaller than most antennas designed to produce comparable results.

These and other features of the present invention will be more clearly understood from the following description of several embodiments together with the accompanying drawings and its scope will be pointed out in the appended claims.

Figure 1:
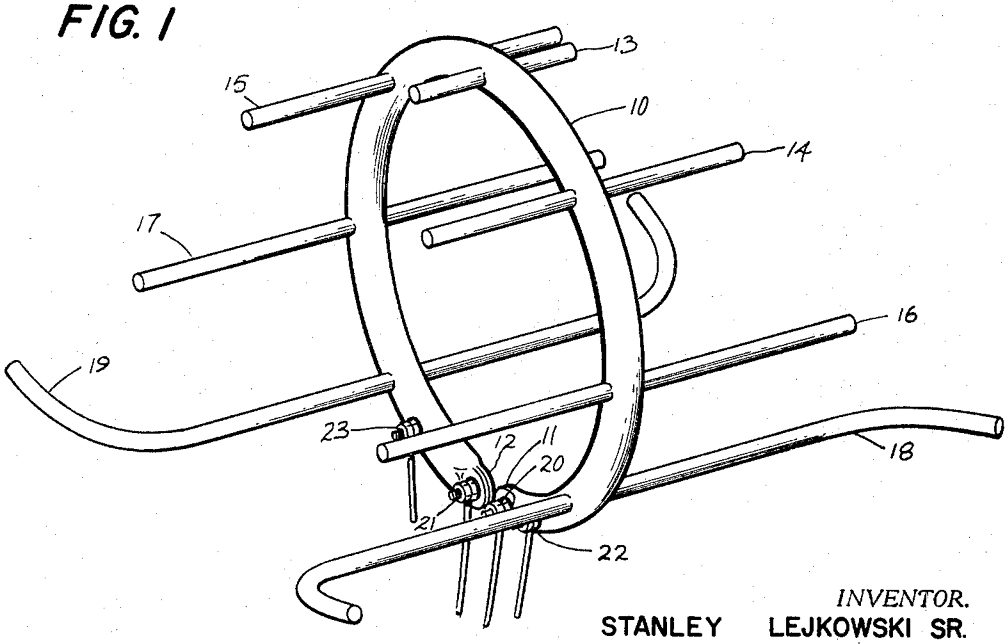

In the drawings:

FIGURE 1 is a view of one embodiment of the present invention incorporating a substantially circular frame member; and, FIGURE 2 is a perspective view of another embodiment of the present invention incorporating a substantially triangular frame member.

Referring now to FIGURE 1, the antenna illustrated comprises a conductive frame member 10 of generally circular configuration which terminates at two ends 11 and 12 spaced from each other and supported by suitable means (not shown) in insulated relationship. The frame member 10 supports a plurality of dipole elements spaced thereabout, which dipole elements are graduated in size from the smallest dipole element 13 disposed at the center or midpoint of the frame member 10 and increasing to the next larger size which comprises a pair of equal length dipole elements 14 and 15 spaced on either side of element 13, to the next larger size dipole elements disposed in paired symmetrical relationship as shown at 16 and 17 and the largest dipole elements similarly disposed on the frame member 10 in symmetrical spaced relationship as shown at 18 and 19. The dipole elements 13, 14, 15, 16, and 17 are straight, rodlike, conductive members while the dipole elements 18 and 19 are seen to have their ends bent in a direction generally parallel to the planar axis of the frame member 10.

The antenna illustrated in FIGURE 1 has a first pair of connections disposed at the insulated ends 11 and 12 which are adapted to receive electrical conductors such as the wired connections made to points 20 and 21 for conducting the received signals to a television broadcast receiver. The connections 20 and 21 at the ends 11 and 12, respectively, of the frame member 10 of the antenna of FIGURE 1 are adapted to provide the received UHF signal. A second pair of connection means is provided as shown at 22 and 23 which connection means are spaced from the insulated ends 11 and 12, respectively, of the frame member 10 of the antenna and are adapted to be connectable to a television broadcast receiver to provide a VHF signal to such receiver.

The frame member in a typical embodiment of the present invention as illustrated in FIGURE 1 may comprise a substantially circularly configured conductive element having a diameter of approximately five inches. Thus, the frame member 10 as illustrated in FIGURE 1 would have an effective electrical length approximately equal to the wave length of the highest frequency it is desired to receive in the UHF range which, it will be recalled, is 890 megacycles having a wave length af approximately thirteen inches. A circular member having a diameter of five inches will define a complete circumference of approximately fifteen and seven-tenths inches. However, with the separated ends of the frame member having a space therebetween of approximately two and one-half inches, the total length of the frame member will be thirteen and two-tenths inches, approximating the wave length of the highest frequency it is desired to receive. It also should be noted that the effective electrical length of the frame member 10 in its circular form as shown in FIGURE 1 is approximately one-sixteenth of the lowest frequency which it is desired to receive, i.e., 54 megacycles which has a wave length of approximately two hundred and nineteen inches. The dipole elements spaced about and supported upon the frame member 10 of the embodiment of the antenna illustrated in FIGURE 1 are graduated in size from the smallest disposed at the midpoint or center of the frame as shown at 13 of approximately two to three inches in length to the largest elements shown in paired symmetrical disposition at 18 and 19 supported on the lower portion of the frame member of approximately twelve to fourteen inches in length. Additional pairs of symmetrically disposed dipole elements are shown at 14 and 15, the next larger size dipole elements adjacent the smallest dipole element 13, being approximately four inches in length. The next larger size graduated elements 16 and 17 are approximately six inches in length and are similarly disposed in symmetrical spaced disposition. Thus it is seen that the graduated dipole elements vary in size and effective electrical length from substantially one-quarter wave length of the highest frequency of the range of frequencies it is desired to receive, to approximately one-sixteenth wave length of the lowest frequency of the range of frequencies it is desired to receive.

Referring now to FIGURE 2, there is illustrated a variant embodiment of the present invention of a somewhat larger size than the embodiment illustrated in FIGURE 1 and having a frame member which is generally of triangular configuration. The embodiment of FIGURE 2 comprises a frame member 24 which is of generally triangular shape and includes two equal lengths of conductive material 25 and 26 which form equilateral sides of an isosceles triangular shape together with a large connecting conductive member 27 which may be considered as the base of such triangular shape. The equal length members 25 and 26 of the frame 24 terminate in insulated ends appropriately supported for connection to a television broadcast receiver. The frame members 25 and 26 are also seen to support dipole type elements of graduated size, the largest of such elements being adjacent the insulated ends of the triangularly shaped frame 24 and the smallest of the dipole elements being disposed adjacent the connecting member 27 of the triangularly shaped frame 24. The dipoles are symmetrically spaced in pairs of equal length such as the smallest pair as shown at 27 and 28, a next larger pair adjacent thereto as shown at 29 and 30, a still larger pair equally spaced from its adjacent pair of dipoles as shown at 33 and 34, and a still larger pair 35 and 36 similarly equally spaced and disposed on the frame members 25 and 26, respectively, with the largest pair of dipole members 37 and 38 disposed adjacent the insulated ends of the frame members 25 and 26, respectively. The ends of the dipole members 37 and 38 are bent generally in a direction parallel to the planar axis of the triangular frame 24. A first pair of connection means is positioned at 39 and 40 at the insulated ends of the frame members 25 and 26, respectively, and is adapted to connect a television broadcast receiver to receive UHF signals from the antenna. A second pair of connection means disposed upwardly along the frame members 25 and 26, respectively, as shown at 41 and 42 is adapted to be connectable to a television broadcast receiver for providing a VHF signal to such receiver.

In a typical embodiment of the configuration shown in FIGURE 2, the frame members of frame 24 may comprise a suitable conductive material, the member 27 having a length of approximately twenty-four inches and the members 25 and 26 having a length of approximately twelve inches each, or a total effective electrical length of approximately forty-eight inches which is approximately four times the wave length of the highest frequency it is desired to receive. Thus, the frame member 24 is of a generally inverted isosceles triangular configuration and its associated dipole members are disposed in symmetrical paired relationship equally spaced from each other and arranged in size from approximately three inches for dipoles 27 and 28 to four inches for dipoles 29 and 30, six inches for dipoles 31 and 32, eight inches for dipoles 33 and 34, ten inches for dipoles 35 and 36, and twelve to fourteen inches for dipoles 37 and 38. Accordingly, the dipole elements are arranged in matched pairs of graduated sizes from approximately one-quarter wave length of the highest frequency of the range of frequencies it is desired to receive, to approximately one-sixteenth of a wave length of the lowest frequency of the range of frequencies which it is desired to receive.

As was the case with the embodiment illustrated in

FIGURE 1, the embodiment illustrated and shown in FIGURE 2 has two pairs of connection means adapted to provide UHF signals and VHF signals to a television broadcast receiver. A first pair of such connections is disposed at 39 and 40 at the ends of the frame members 25 and 26, respectively, and is adapted and designed to provide a UHF signal to a television broadcast receiver. A second pair of suitable connections is disposed in equally displaced relationship along the frame members 25 and 26 as shown at 41 and 42, respectively, and is adapted to be connected to a suitable lead wire means to provide a VHF signal to a television broadcast receiver. It has been found that in the use of the antenna of the present invention no special impedance matching elements or circuitry are required, since conventional television lead wire having the usual impedance characteristics performs well with the antenna under usual conditions.

As will be appreciated by those skilled in the art, the dimensions of typical configurations of the antenna of the present invention are such as to afford a readily fabricated, relatively inexpensive antenna which is susceptible to rugged construction, rendering it highly durable under all weather conditions, as well as conservative of space. It has been found that the antenna of the present invention provides adequate signal strength to a television broadcast receiver throughout the full ranges of the VHF television broadcast band and the UHF television broadcast band even in fringe areas where distance from the transmitting antenna and topographical configurations usually present severe attenuation problems.

Since many changes could be made in the above construction, and many apparently widely different embodiments of the invention could be made without departing from the scope or spirit thereof, it is intended that all matter contained in the above description or shown in the accompanying drawings shall be interpreted as illustrative and not in a limiting sense.

Having thus described my invention, I claim:

1. An antenna operable within two frequency ranges spread from one another in the frequency spectrum comprising: a conductive frame disposed along a planar axis and having a pair of adjacent ends supported in spaced insulated disposition, said frame having an electrical length substantially equal to an integral multiple of the wave length of the highest frequency of said frequency ranges and not less than one-sixteenth wave length of the lowest frequency of said ranges; a plurality of spaced dipole elements supported on said frame, said dipoles being graduated in size from an electrical length of substantially one-quarter wave length of the highest frequency of said ranges to substantially one-sixteenth wave length of the lowest frequency of said frequency ranges; connection means at the insulated ends of said frame for the higher of said two frequency ranges; and connection means for the lower of said frequency ranges disposed on said frame and spaced from its insulated ends.

2. An antenna operable within two frequency ranges spaced from one another in the frequency spectrum comprising: a conductive frame disposed along a planar axis in a generally triangular configuration and having a pair of adjacent ends supported in spaced insulated disposition, said frame having an electrical length substantially equal to an integral multiple of the wave length of the highest frequency of said frequency ranges and not less than one-sixteenth of the wave length of the lowest frequency of said ranges; a plurality of spaced dipole elements supported on said frame normal to the planar axis of said frame, said dipoles being graduated in size from an electrical length of substantially one-quarter wave length of the highest frequency of said ranges to substantially one-sixteenth wave length of the lowest frequency of said frequency ranges; connection means at the insulated ends of said frame for the higher of said two frequency ranges; and connection means for the lower of said frequency ranges disposed on said frame and spaced from its insulated ends.

3. An antenna as claimed in claim 2 wherein said dipoles comprise symmetrically positioned pairs of equal lengths.

4. An antenna as claimed in claim 3 wherein said triangular frame is generally in the form of an isosceles triangle and said dipoles are supported at equally spaced intervals along the equal legs of said triangular frame.

5. An antenna as claimed in claim 4 wherein said generally triangular frame has a base leg substantially twice the length of said equal legs.

6. An antenna as claimed in claim 4 wherein the smallest of said dipoles are mounted adjacent the base of said generally triangular configuration and the largest of said dipoles is mounted adjacent said spaced insulated frame ends.

7. An antenna as claimed in claim 6 wherein the largest of said dipoles have bent ends generally parallel to the planar axis of said frame.

8. An antenna as claimed in claim 6 wherein said dipole elements comprise six pairs of equally and symmetrically spaced elements.

9. An antenna as claimed in claim 8 wherein the total effective electrical length of said generally triangular frame is about 48 inches.

10. An antenna operable within two frequency ranges spaced from one another in the frequency spectrum comprising: a conductive frame disposed along a planar axis in a generally circular configuration and having a pair of ends supported in spaced insulated disposition, said frame having an electrical length substantially equal to an integral multiple of the wave length of the highest frequency of said frequency ranges and not less than one-sixteenth of the wave length of the lowest frequency; a plurality of spaced dipole elements supported on said frame normal to the planar axis of said frame, said dipoles being graduated in size from an electrical length of substantially one-quarter wave length of the highest frequency of said ranges to substantially one-sixteenth wave length of the lowest frequency of said frequency ranges; connection means at the insulated ends of said frame for higher of said two frequency ranges; and connection means for the lower of said frequency ranges disposed on said frame and spaced from its insulated ends.

11. An antenna as claimed in claim 10 wherein said frame has an electrical length substantially equal to the wave length of the highest frequency of said frequency ranges.

12. An antenna as claimed in claim 10 wherein the smallest of said dipoles is positioned at the middle of said circular frame and the remainder of said dipoles comprise symmetrically positioned and spaced pairs of elements of equal lengths.

13. An antenna as claimed in claim 12 wherein said symmetrically disposed dipole elements comprise seven in number.

14. An antenna as claimed in claim 13 wherein the largest of said dipoles are mounted adjacent said insulated ends and the smallest of dipoles are mounted furthest from said insulated ends.

15. An antenna as claimed in claim 14 wherein the largest of said dipoles have bent ends generally parallel to the planar axis of said frame.

References Cited

UNITED STATES PATENTS

| | | | |
|---|---|---|---|
| 2,657,312 | 10/1953 | Saranga | 343—726 X |
| 3,035,266 | 5/1962 | Marshall | 343—799 |
| 3,267,479 | 8/1966 | Smith et al. | 343—792.5 X |

ELI LIEBERMAN, *Primary Examiner.*

PAUL L. GENSLER, *Examiner.*